US012600574B2

(12) United States Patent
Howe et al.

(10) Patent No.: US 12,600,574 B2
(45) Date of Patent: Apr. 14, 2026

(54) ON-DEMAND GLASSWASHER AND A METHOD OF OPERATING THE SAME

(71) Applicant: Moyer Diebel Ltd., Jordan Station (CA)

(72) Inventors: Raymond Charles Howe, Grimsby (CA); Ivan Josip Katkic, Oakville (CA)

(73) Assignee: Moyer Diebel Ltd., Jordan Station (CA)

( * ) Notice: Subject to any disclaimer, the term of this patent is extended or adjusted under 35 U.S.C. 154(b) by 663 days.

(21) Appl. No.: 18/081,810

(22) Filed: Dec. 15, 2022

(65) Prior Publication Data

US 2023/0192415 A1 Jun. 22, 2023

Related U.S. Application Data

(60) Provisional application No. 63/290,766, filed on Dec. 17, 2021.

(51) Int. Cl.
| | |
|---|---|
| *B65G 43/08* | (2006.01) |
| *B65G 29/00* | (2006.01) |
| *B65G 49/05* | (2006.01) |

(52) U.S. Cl.
CPC ............. *B65G 43/08* (2013.01); *B65G 29/00* (2013.01); *B65G 49/05* (2013.01); *B65G 2203/042* (2013.01); *B65G 2207/28* (2013.01)

(58) Field of Classification Search
CPC ........ B65G 29/00; B65G 43/08; B65G 49/05; B65G 2207/28; A47L 15/0073; A47L 15/0076; A47L 15/0021; A47L 15/4295; A47L 2401/04; A47L 2501/24; A47L 2501/28; A47L 2501/30; A47L 2501/32
See application file for complete search history.

(56) References Cited

U.S. PATENT DOCUMENTS

| | | | | |
|---|---|---|---|---|
| 3,878,856 A * | 4/1975 | Hall ...................... | A47L 15/243 |
| | | | | 134/80 |
| 3,942,545 A * | 3/1976 | Flynn .................... | A47L 15/243 |
| | | | | 134/152 |
| 4,420,003 A * | 12/1983 | Lee ........................ | A47L 15/243 |
| | | | | 134/152 |
| 4,832,064 A * | 5/1989 | Nezworski ............ | A47L 15/243 |
| | | | | 134/146 |
| 5,704,380 A * | 1/1998 | Zelniker ............. | A47L 15/0073 |
| | | | | 134/98.1 |
| 11,083,291 B2 * | 8/2021 | Dockery ................ | G01N 35/00 |

(Continued)

*Primary Examiner* — Joseph C Rodriguez
(74) *Attorney, Agent, or Firm* — Rowand LLP

(57) ABSTRACT

An on-demand glasswasher comprises a drive motor; a rotary conveyor connected to the drive motor; an ultrasonic sensor assembly positioned adjacent to the rotary conveyor; a microprocessor connected to the drive motor and the ultrasonic sensor assembly; and a memory device coupled to the microprocessor, the memory device storing processor-executable instructions which, when executed by the microprocessor, cause the microprocessor to receive, from the ultrasonic sensor assembly, ultrasonic signals; analyze the ultrasonic signals to detect the presence of one or more objects on the rotary conveyor; and responsive to detecting the presence of one or more objects on the rotary conveyor, perform operations to stop operation of the on-demand glasswasher.

20 Claims, 15 Drawing Sheets

(56) References Cited

U.S. PATENT DOCUMENTS

| 12,268,346 | B2 * | 4/2025 | Boyer | ................. | A47L 15/4297 |
| 2011/0260553 | A1 * | 10/2011 | Poyner | ................ | A47L 15/0049 |
| | | | | | 307/115 |
| 2018/0028044 | A1 * | 2/2018 | Anim-Mensah | ........ | A47L 15/44 |
| 2022/0258327 | A1 * | 8/2022 | Bangalore Srinivas | .................... | |
| | | | | | B65G 1/1378 |

* cited by examiner

900

ON-DEMAND GLASSWASHER AND A METHOD OF OPERATING THE SAME

CROSS-REFERENCE TO RELATED APPLICATIONS

This application claims the benefit of U.S. Provisional Application No. 63/290,766, filed on Dec. 17, 2021, the entire contents of which are incorporated herein by reference.

TECHNICAL FIELD

The present disclosure relates to an on-demand glasswasher and a method of operating the same.

BACKGROUND

On-demand glasswashers are used in commercial settings and may be continuously operated to wash glasses.

BRIEF DESCRIPTION OF THE DRAWINGS

Embodiments are described in detail below, with reference to the following drawings:

FIG. 6B is a cross-sectional view of a vane of a conveyor forming part of the motor and conveyor system of FIG. 5;

Like reference numerals are used in the drawings to denote like elements and features.

DETAILED DESCRIPTION OF VARIOUS EMBODIMENTS

Figure 1:
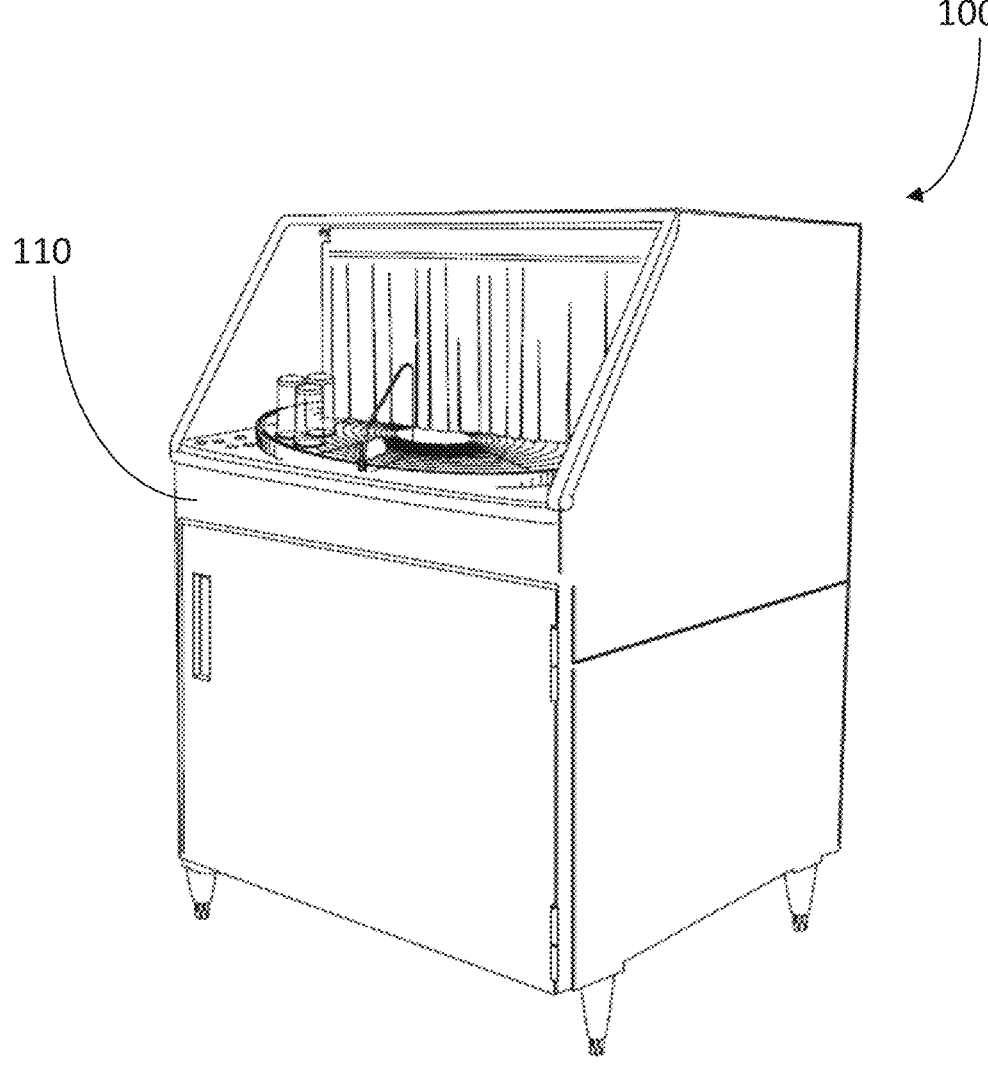
FIG. 1 is an isometric view of an on-demand glasswasher.

In an aspect, there is provided an on-demand glasswasher comprising a drive motor; a rotary conveyor connected to the drive motor; an ultrasonic sensor assembly positioned adjacent to the rotary conveyor; a microprocessor connected to the drive motor and the ultrasonic sensor assembly; and a memory device coupled to the microprocessor, the memory device storing processor-executable instructions which, when executed by the microprocessor, cause the microprocessor to receive, from the ultrasonic sensor assembly, ultrasonic signals; analyze the ultrasonic signals to detect a presence of one or more objects on the rotary conveyor; and responsive to detecting the presence of one or more objects on the rotary conveyor, perform operations to stop operation of the glass-washer.

In one or more embodiments, responsive to detecting the presence of the one or more objects, the instructions, when executed by the microprocessor, further cause the microprocessor to receive, from the ultrasonic sensor assembly, additional ultrasonic signals; analyze the additional ultrasonic signals to detect removal of the one or more objects from the rotary conveyor; and; responsive to detecting removal of the one or more objects from the rotary conveyor, perform operations to start operation of the on-demand glass-washer.

In one or more embodiments, the ultrasonic sensor assembly includes a casing and an ultrasonic sensor positioned within the casing, the casing defining an opening that allows ultrasonic signals emitted by the ultrasonic sensor to travel into the on-demand glasswasher.

In one or more embodiments, the casing includes a rounded surface that extends at least partially into the on-demand glasswasher, the rounded surface dimensioned to reduce or minimize a risk of the one or more objects falling over or being scratched when coming into contact therewith.

In one or more embodiments, the on-demand glasswasher further comprises a cylinder positioned within an opening defined in a center of the rotary conveyor, wherein at least a portion of the cylinder extends above a surface of the rotary conveyor, the cylinder reflecting ultrasonic signals emitted by the ultrasonic sensor back towards the ultrasonic sensor when no objects are located on the rotary conveyor between the cylinder and the ultrasonic sensor.

In one or more embodiments, a longitudinal axis of the ultrasonic sensor is perpendicular to a tangential axis of the cylinder.

In one or more embodiments, the on-demand glasswasher further comprises a sanitary divider connected to a housing of the on-demand glasswasher at a location adjacent to the ultrasonic sensor assembly, the sanitary divider comprising a panel that extends into the housing to separate a load zone and a clean zone of the on-demand glasswasher.

In one or more embodiments, the sanitary divider comprises a hook dimensioned to connect to a portion of the housing.

In one or more embodiments, when detecting the presence of one or more objects, the instructions, when executed by the microprocessor, further cause the microprocessor to determine, based on the ultrasonic signals, a distance between the one or more objects and the ultrasonic sensor assembly; compare the distance to a known distance between a cylinder of the on-demand glasswasher and the ultrasonic sensor assembly; and determine the presence of the one or more objects when the distance between the one or more objects and the ultrasonic sensor assembly is less than the known distance between the cylinder of the on-demand glasswasher and the ultrasonic sensor assembly.

In one or more embodiments, an ultrasonic sensor of the ultrasonic sensor assembly emits the ultrasonic signals at a frequency of 200 kHz.

According to another aspect there is provided a method of operating an on-demand glasswasher, the method comprising receiving, from an ultrasonic sensor assembly, ultrasonic signals; analyzing the ultrasonic signals to detect the presence of one or more objects on a rotary conveyor; and responsive to detecting a presence of one or more objects on the rotary conveyor, performing operations to stop operation of the glass-washer.

In one or more embodiments, responsive to detecting the presence of the one or more objects, the method further comprises receiving, from the ultrasonic sensor assembly, additional ultrasonic signals; analyzing the additional ultrasonic signals to detect removal of the one or more objects from the rotary conveyor; and responsive to detecting removal of the one or more objects from the rotary conveyor, perform operations to start operation of the on-demand glass-washer.

In one or more embodiments, the ultrasonic sensor assembly includes a casing and an ultrasonic sensor positioned within the casing, the casing defining an opening that allows ultrasonic signals emitted by the ultrasonic sensor to travel into the on-demand glasswasher.

In one or more embodiments, the casing includes a rounded surface that extends at least partially into the on-demand glasswasher, the rounded surface dimensioned to reduce or minimize a risk of the one or more objects falling over or being scratched when coming into contact therewith.

In one or more embodiments, the on-demand glasswasher further comprises a cylinder positioned within an opening defined in a center of the rotary conveyor, wherein at least a portion of the cylinder extends above a surface of the rotary conveyor, the cylinder reflecting ultrasonic signals emitted by the ultrasonic sensor back towards the ultrasonic sensor when no objects are located on the rotary conveyor between the cylinder and the ultrasonic sensor.

In one or more embodiments, a longitudinal axis of the ultrasonic sensor is perpendicular to a tangential axis of the cylinder.

In one or more embodiments, the on-demand glasswasher further comprises a sanitary divider connected to a housing of the on-demand glasswasher at a location adjacent to the ultrasonic sensor assembly, the sanitary divider comprising a panel that extends into the housing to separate a load zone and a clean zone of the on-demand glasswasher.

In one or more embodiments, the sanitary divider comprises a hook dimensioned to connect to a portion of the housing.

In one or more embodiments, when detecting the presence of one or more objects, the method further comprises determining, based on the ultrasonic signals, a distance between the one or more objects and the ultrasonic sensor assembly; comparing the distance to a known distance between a cylinder of the on-demand glasswasher and the ultrasonic sensor assembly; and determining the presence of the one or more objects when the distance between the one or more objects and the ultrasonic sensor assembly is less than the known distance between the cylinder of the on-demand glasswasher and the ultrasonic sensor assembly.

In one or more embodiments, an ultrasonic sensor of the ultrasonic sensor assembly emits the ultrasonic signals at a frequency of 200 kHz.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

Figure 2:
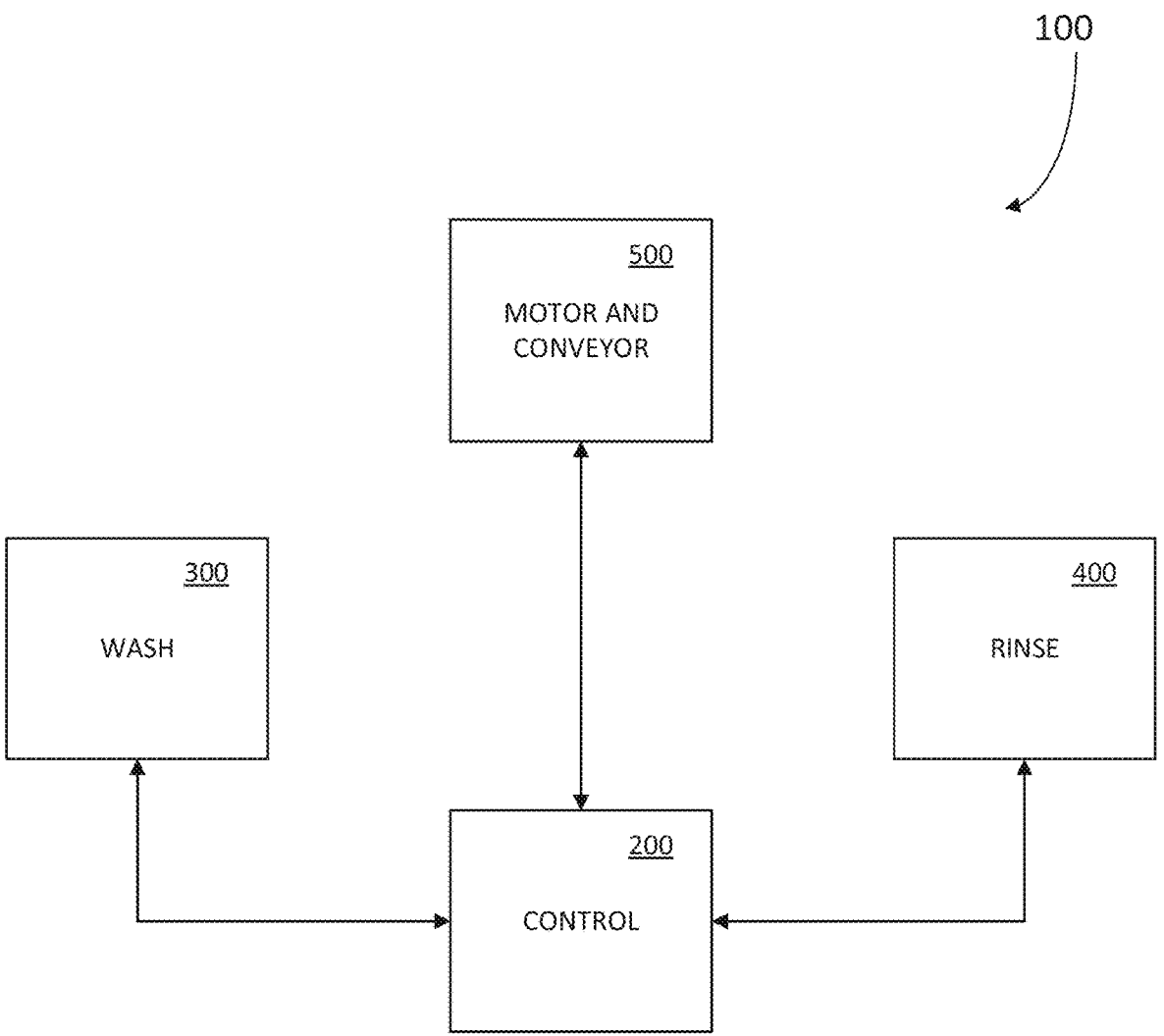
FIG. 2 is a schematic view showing various components of the on-demand glasswasher of FIG. 1.

Turning to FIGS. 1 and 2, an on-demand glasswasher is shown and is generally identified by reference numeral 100. The on-demand glasswasher 100 includes a control system 200 (FIG. 2), a wash system 300 (FIG. 3), a rinse system 400 (FIG. 4), a motor and conveyor system 500 (FIG. 5 and FIG. 6), an ultrasonic sensor assembly 700 (FIG. 7), a sanitary divider 800 (FIG. 8), a cylinder 900 (FIG. 9) and a housing 110 that houses the various components therein. The on-demand glasswasher 100 includes a rotary conveyor and is used to wash glasses such as for example glassware, drinkware, barware, wine glasses, etc. as they travel along the rotary conveyor.

The control system 200 includes at least a microprocessor and a memory device. The memory device is provided to store, amongst other things, instructions that, when executed by the microprocessor, causes the microprocessor to control operation of the on-demand glasswasher 100 and the various components thereof. Example instructions will be described in more detail below.

Figure 3:
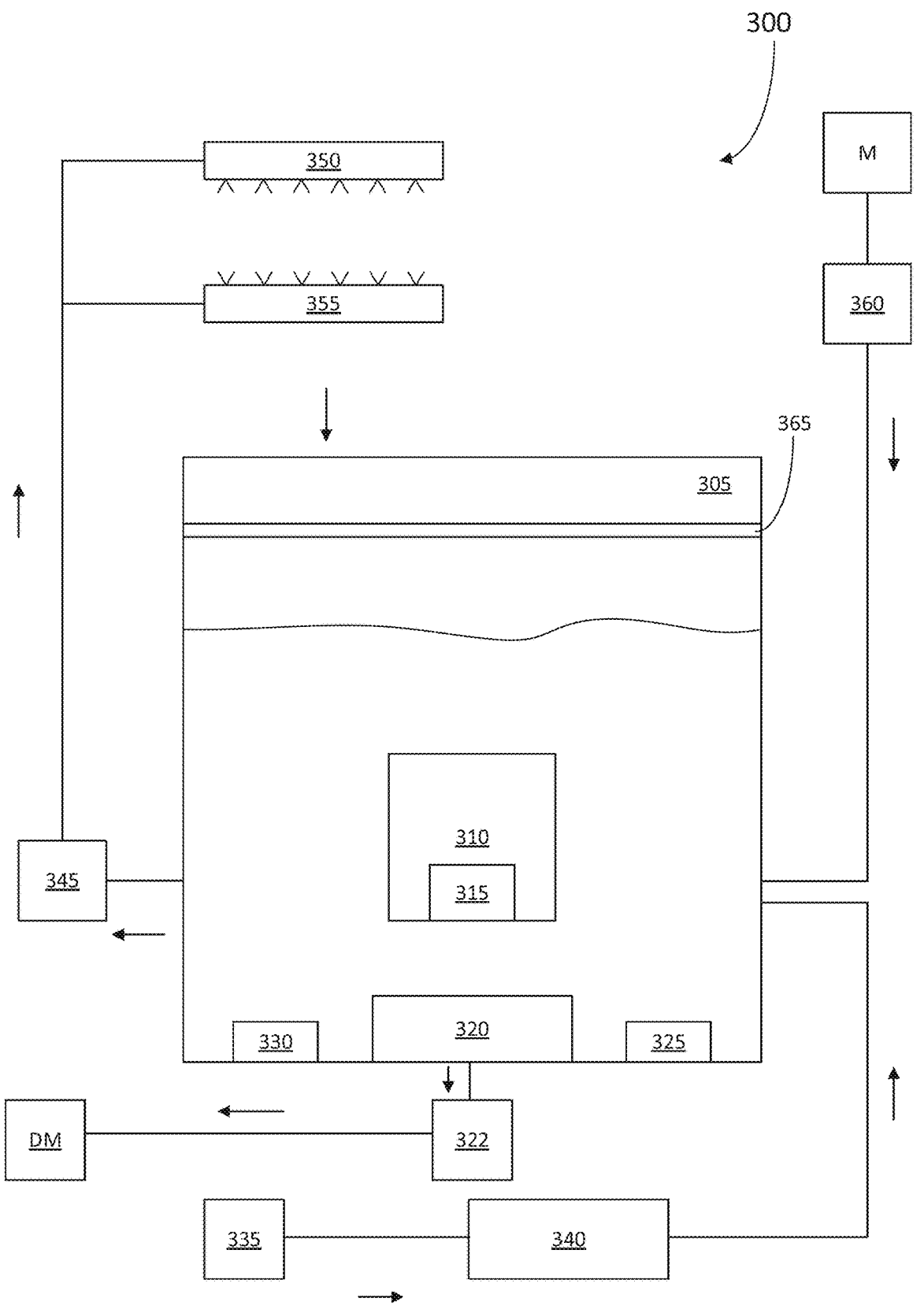
FIG. 3 is a schematic view of a wash system forming part of the on-demand glasswasher of FIG. 1.

The wash system 300 is shown in FIG. 3. The wash system 300 includes a wash tank 305, a heater 310, a bi-metal safety 315, a drain 320, an ultrasonic water level sensor 325, a thermistor 330, a detergent dispenser 335, an injector 340, a pump 345, upper wash arms 350, lower wash arms 355, a valve 360, and a screen 365.

The wash tank 305 receives water from water mains M via the valve 360. Put another way, the valve 360 is connected to the water mains and is used to selectively fill the wash tank 305 with water from the water mains M. The valve 360 may be connected to and controlled by the control system 200.

The heater 310 is located within the wash tank 305 and is configured to heat water stored in the wash tank 305. The bi-metal safety 315 is connected to the heater 310 and is configured to monitor a temperature of the heater. In the event that the temperature of the heater 310 goes above a threshold temperature, the bi-metal safety 315 is configured to shut-off the heater. The heater 310 and/or the bi-metal safety 315 may further be connected to and controlled by the control system 200.

The drain 320 is located in the bottom of the wash tank 305 and is configured to drain water and/or soap water from the wash tank 305. In one or more embodiments, the drain 320 may be connected to a drain pump 322 that may be used to pump the drain water and/or soap water to drain mains DM. The drain 320 and/or drain pump 322 may be connected to and controlled by the control system 200.

The ultrasonic water level sensor 325 is located within the wash tank 305 and is configured to monitor a level of water in the wash tank 305. Specifically, the ultrasonic water level sensor 325 emits ultrasonic signals into the wash tank 305. The ultrasonic signal is reflected, by the water, back to the ultrasonic water level sensor 325. The ultrasonic water level sensor 325 receives the reflected ultrasonic signal and communicates the reflected ultrasonic signal to the control system 200 where it is processed to determine the level of water in the wash tank 305.

The thermistor 330 is located within the wash tank 305 and is configured to monitor a temperature of the water in the wash tank 305. The thermistor 330 may be connected to and controlled by the control system 200.

The detergent dispenser 335 provides detergent to the wash tank 305 via the injector 340. The injector 340 may be connected to and controlled by the control system 200.

Within the wash tank 305, the water contained therein and the detergent are combined to create soap water that may be used to clean one or more objects as they travel along at least a portion of the rotary conveyor. Specifically, the pump 345 is connected to the wash tank 305 and is configured to pump soap water contained in the wash tank 305 to the upper wash arms 350 and the lower wash aims 355.

The upper wash arms 350 and lower wash arms 355 are positioned to dispense the soap water received from the wash tank 305 via the pump 345. Specifically, the upper wash arms 350 and the lower wash arms 355 are positioned above and below the rotary conveyor (not shown), respectively. Each one of the wash arms includes at least one nozzle configured to direct the egress of soap water towards the rotary conveyor (not shown). The at least one nozzle may include a plurality of nozzles. In this manner, soap water from the wash tank 305 is used to clean one or more objects as they travel along the rotary conveyor (not shown).

The screen 365 is positioned between the upper wash arms 350 and the lower wash arms 355 and the wash tank 305. The screen 365 is used to capture or filter debris received from the one or more objects as they are cleaned.

During operation of the wash system 300, the wash tank 305 is filled with a predefined amount of water via the valve 360 and is filled with a predefined amount of detergent from the detergent dispenser 335 via the injector 340. The water and the detergent are combined within the wash tank 305 to create soap water. The soap water is heated to a predefined temperature using the heater 310.

As objects travel along a portion of the rotary conveyor, soap water is directed out of the nozzles of the upper wash arms 350 and the lower wash arms 355 and towards the objects. The soap water cleans the objects and excess soap water and any debris from the objects travels through the screen 365 and back into the wash tank 305. In the event that the amount of soap water in the wash tank 305 drops below a certain level, the control system 200 may perform operations to refill or top-up the wash tank 305 with water and detergent. In this manner, the wash system 300 may operate continuously to clean objects as they are placed on the rotary conveyor.

The rinse system 400 is positioned downstream of the wash system 300. Put another way, as objects travel along the rotary conveyor, they pass through the wash system 300 and then pass through the rinse system 400. In this manner, the objects are rinsed by the rinse system 400 after they are washed by the wash system 300.

Figure 4:
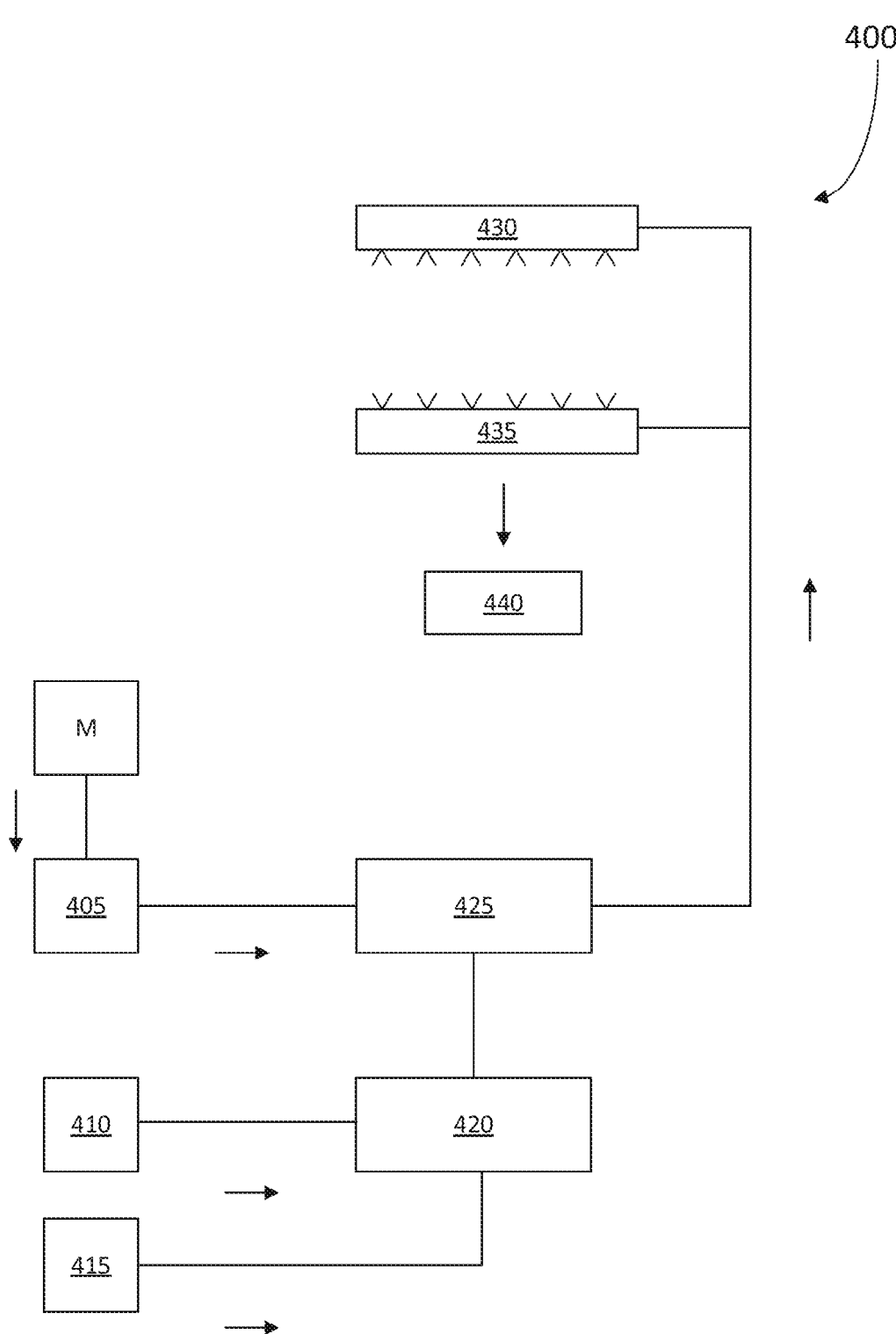
FIG. 4 is a schematic view of a rinse system forming part of the on-demand glasswasher of FIG. 1.

The rinse system 400 is shown in FIG. 4. The rinse system 400 includes a valve 405, a sanitizer dispenser 410, a rinse-aid dispenser 415, an injector 420, an injection fitting 425, upper rinse arms 430, lower rinse arms 435 and a drain 440.

The rinse system 400 receives water from the water mains M via the valve 405. It will be appreciated that the water received from the water mains M may be cold water, that is, the water is not heated. The water travels to the injection fitting 425. The valve 405 may be connected to and controlled by the control system 200.

The sanitizer dispenser 410 provides sanitizer to the injection fitting 425 via the injector 420 and similarly the rinse-aid dispenser 415 provides rinse-aid to the injection fitting 425 via the injector 420. The injector 420 may be connected to and controlled by the control system 200. The injector 420 may be the same injector as the injector 340 of the wash system 300.

The injection fitting 425 receives the water from the water mains via the valve 405, the sanitizer from the sanitizer dispenser 410 via the injector 420, and rinse-aid from the rinse-aid dispenser 415 via the injector 420 and provides the mixture to the upper rinse arms 430 and the lower rinse arms 435.

The upper rinse arms 430 and the lower rinse arms 435 are positioned to dispense the mixture received from the injection fitting 425. Specifically, the upper rinse arms 430 and the lower rinse arms 435 are positioned above and below the rotary conveyor (not shown), respectively. Each one of the rinse arms includes at least one nozzle that is configured to direct the egress of the mixture towards the rotary conveyor (not shown). The at least one nozzle may include a plurality of nozzles. In this manner, the mixture of water, sanitizer and rinse-aid is used to rinse one or more objects as they travel along the rotary conveyor (not shown).

The drain 440 is located below the upper rinse arms 430 and the lower rinse arms 435. The drain 440 is configured to drain the mixture from the rinse system 400. The drain 440 may be connected to drain mains and as such the mixture received by the drain 440 may be drained out through the drain mains. Similar to the drain 320, the drain 440 may be connected to a drain pump which may be used to pump the mixture to the drain mains. The drain 440 and/or the drain pump may be connected to and controlled by the control system 200. A screen may be provided to capture or filter debris received from the one or more objects as they are rinsed and the screen may be positioned between the upper rinse arms 430 and the lower rinse arms 435 and the drain 440.

During operation of the rinse system 400, the injection fitting 425 receives the water from the water mains via the valve 405, the sanitizer from the sanitizer dispenser 410 via the injector 420, and rinse-aid from the rinse-aid dispenser 415 via the injector 420 and provides the mixture to the upper rinse arms 430 and the lower rinse arms 435.

After being washed by the wash system 300, objects travel along a portion of the rotary conveyor towards the rinse system 400. As the objects travel through the rinse system 400, the mixture is directed out of the nozzles of the upper rinse arms 430 and the lower rinse arms 435 towards the objects. The mixture rinses the objects and excess mixture travels down through the drain 440.

Figure 5:
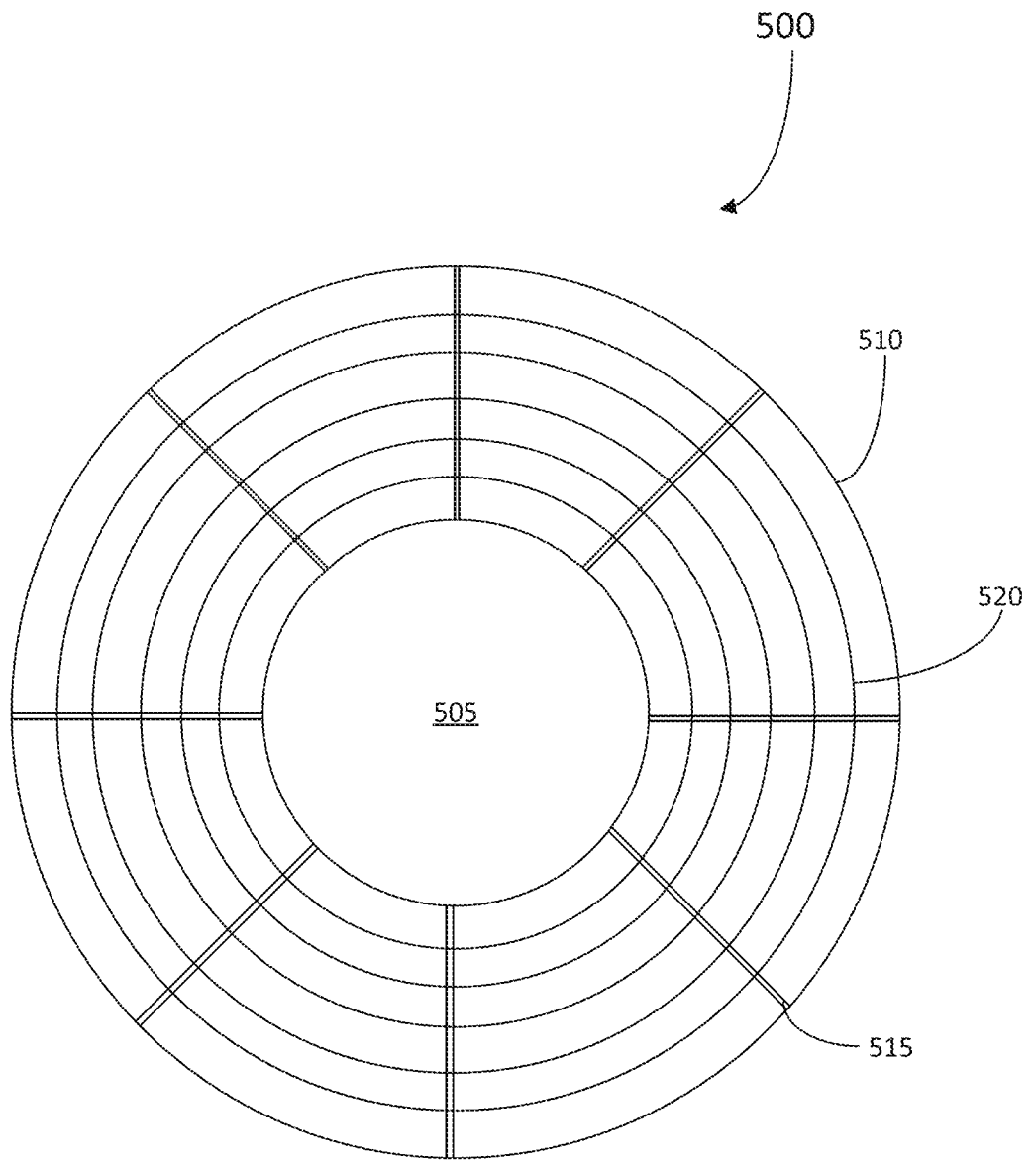
FIG. 5 is a top plan view of a motor and conveyor system forming part of the on-demand glasswasher of FIG. 1.

Turning to FIG. 5, the motor and conveyor system 500 are shown. The motor and conveyor system 500 includes a motor 505 and a rotary conveyor 510. In this embodiment, the motor 505 is a drive motor that is connected to the rotary conveyor 510 such that rotation of the motor 505 causes rotation of the rotary conveyor 510. The motor 505 is connected to and controlled by the control system 200.

Figure 6A:
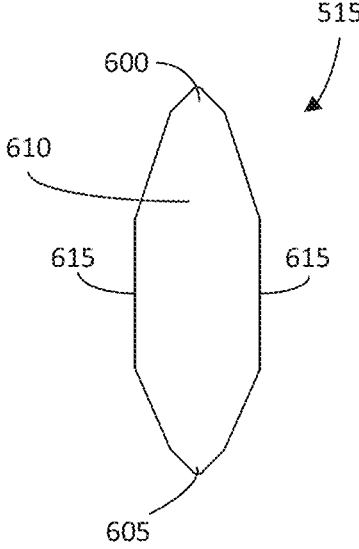
FIG. 6A is a cross-sectional view of a rib of a conveyor forming part of the motor and conveyor system of FIG. 5.
Figure 6A:
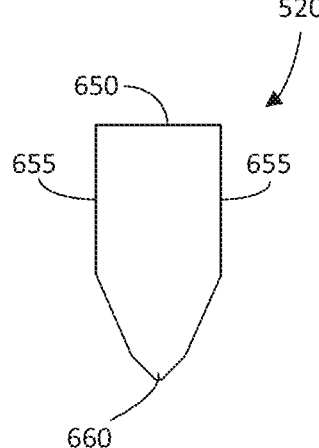

In this embodiment, the rotary conveyor 510 comprises a plurality of concentric ribs 515. The cross-section of each rib 515 is shown in FIG. 6A. As can be seen, a top portion of the rib 515 includes a circular ridge 600 and the bottom portion of the rib 515 includes a circular ridge 605. A body 610 of the rib 515 includes spaced-apart parallel edges 615. The circular ridges 600 and 605 taper towards the parallel edges 615. The shape of the cross-section of the rib 515 reduces the amount of splash a liquid has when contacting the rib 515. Specifically, the shape of the rib 515 directs liquid that contacts the rib 515 from the top portion of the rib 515, down towards the body 610, and to the bottom portion of the rib 515.

The rotary conveyor 510 comprises a plurality of radially extending vanes 520. The radially extending vanes 520 are connected to the concentric ribs 515. The cross-section of each vane 520 is shown in FIG. 6B. As can be seen, a top portion 650 of the vane 520 is generally flat. Sides 655 of the vane 520 extend down from the top portion 650 at a generally right angle. A bottom portion of the vane 520 tapers to a rounded end 660. The shape of the vanes 520 reduces or minimizes the splash of a liquid that contacts the vanes 520.

Figure 7:
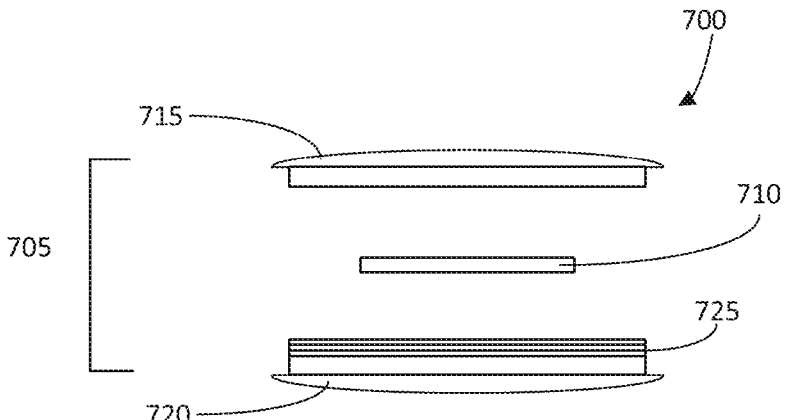
FIG. 7 is an exploded view of an ultrasonic sensor assembly forming part of the on-demand glasswasher of FIG. 1.

An exploded view of the ultrasonic sensor assembly 700 is shown in FIG. 7. As will be described in more detail, the ultrasonic sensor assembly 700 is used to detect the presence of one or more objects on the rotary conveyor 510. The ultrasonic sensor assembly 700 is connected to and controlled by the control system 200.

In this embodiment, the ultrasonic sensor assembly 700 includes a casing 705 and an ultrasonic sensor 710. The casing 705 includes a first fitting 715 and a second fitting 720. The first fitting 715 include a slightly rounded face. The first fitting 715 and the second fitting 720 are connected to one another via threadings 725 to form the casing 705. Specifically, the second fitting 720 may be positioned on an exterior of the housing 110 and may extend through an opening defined therein. The first fitting 715 and the ultrasonic sensor 710 may be positioned on an interior of the housing 110 and may connect to the second fitting 720 via the threadings 725 and via threadings defined on an interior of the first fitting 715. In this manner, the ultrasonic sensor assembly 700 may be connected to the housing 710.

In one or more embodiments, rather than threadings, the first fitting 715 and the second fitting 720 may be connected to one another via a snap-fit connection to form the casing 705. It will be appreciated that the first fitting 715 and the second fitting 720 may be connected in other ways.

In this embodiment, an opening is defined in the second fitting 720. The opening is dimensioned to receive and retain the ultrasonic sensor 710. In this manner, the casing 705 does not interfere with ultrasonic signals emitted by the ultrasonic sensor 710. Although not shown in FIG. 7, an O-ring is used to form a seal between the ultrasonic sensor 710 and the opening to ensure water and other liquids do not enter the casing 705. It will be appreciated that in one or more embodiments, rather than having an opening, the casing may be made of a material that allows ultrasonic signals to pass therethrough and as such no opening is required.

The ultrasonic sensor 710 includes a piezoelectric crystal and is configured to emit ultrasonic signals at a frequency of approximately 200 kHz. It will be appreciated that any ultrasonic frequency may be used.

As will be described in more detail below, the ultrasonic sensor assembly 700 is positioned within the housing 110 of the on-demand glasswasher 100 such that the rounded face of the second fitting 720 extends out from the housing 110. In this manner, the rounded face protects the ultrasonic sensor 710 and prevents or otherwise minimizes the risk of glasses falling over or being scratched should they come into contact therewith as they travel along the rotary conveyor.

Figure 8:
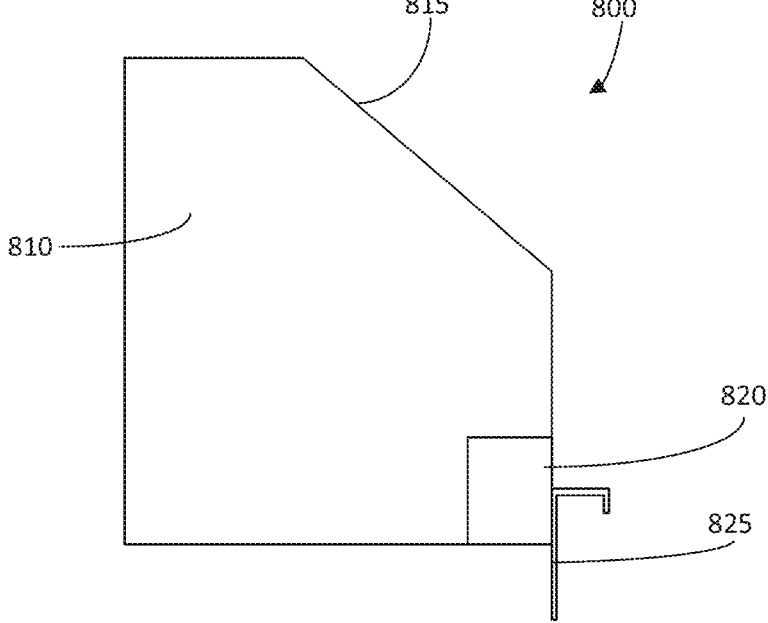
FIG. 8 is a side view of a sanitary divider forming part of the on-demand glasswasher of FIG. 1.

The sanitary divider 800 is shown in FIG. 8. In this embodiment, the sanitary divider 800 includes a panel 810 that is made of a rigid material such as for example plastic and the rigid material may be transparent. The panel 810 is generally rectangular and includes a tapered section 815 at a top side thereof. The tapered section 815 extends downward from the top surface to a side of the panel 810. The sanitary divider 800 includes a bracket 820 that is dimensioned to receive and retain the panel 810. Specifically, the bracket 820 includes a parallel spaced apart sections that define an opening to receive and retain a portion of the panel 810. Fasteners such as screws may be used to secure the panel 810 in the bracket 820. The bracket 820 includes a hook 825 that is dimensioned to connect to a portion of the housing 710.

In one or more embodiments, the sanitary divider 800 divides or separates a load zone and a clean zone of the on-demand glasswasher 100 and this may ensure any dirt or debris from dirty or unwashed glasses does not contact or soil clean glasses located in the clean zone.

Figure 9:
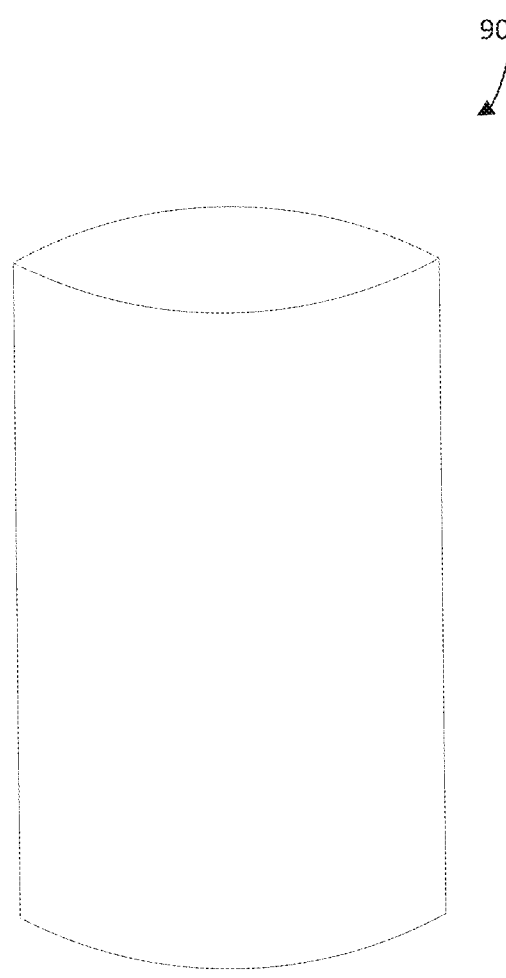
FIG. 9 is an isometric view of a cylinder forming part of the on-demand glasswasher of FIG. 1.

The cylinder 900 is shown in FIG. 9. The cylinder 900 is made of a material that reflects ultrasound signals emitted by the ultrasonic sensor 710. For example, the cylinder 900 may be made of stainless steel. The cylinder 900 is dimensioned to be circumscribed by the rotary conveyor 510. Specifically, the cylinder 900 is dimensioned to be positioned within the center of the rotary conveyor 510 such that at least a portion of the cylinder 900 extends above the rotary conveyor 510 while still allowing the rotary conveyor 510 to rotate.

The cylinder 900 reflects ultrasound signals that are emitted by the ultrasonic sensor 710 and that contact the surface of the cylinder 900. Further, the rounded surface of the cylinder 900 prevents or otherwise minimizes the risk of glasses falling over or being scratched should they come into contact therewith.

Figure 10:
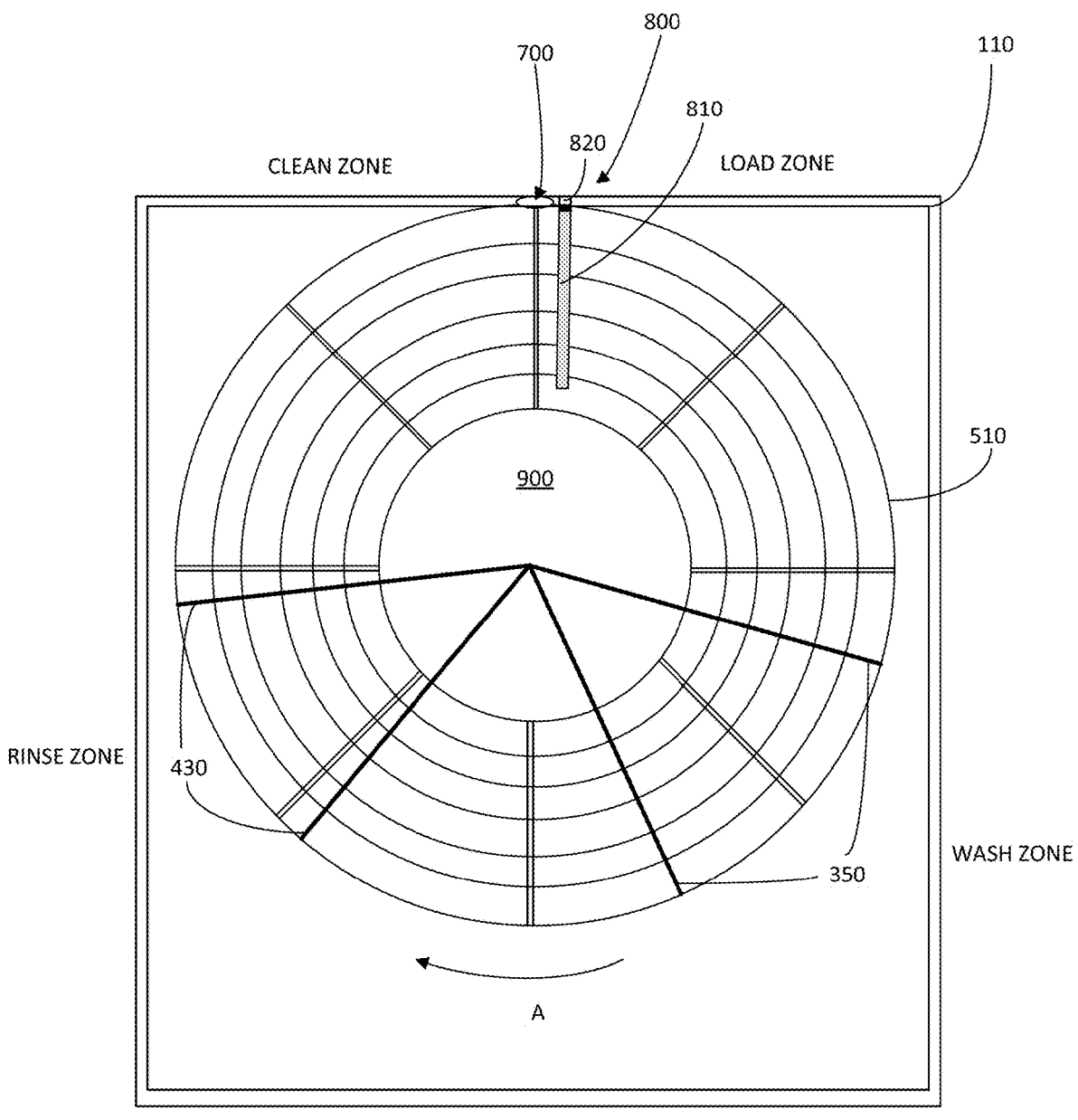
FIG. 10 is a top plan view of the on-demand glasswasher of FIG. 1.
Figure 11:
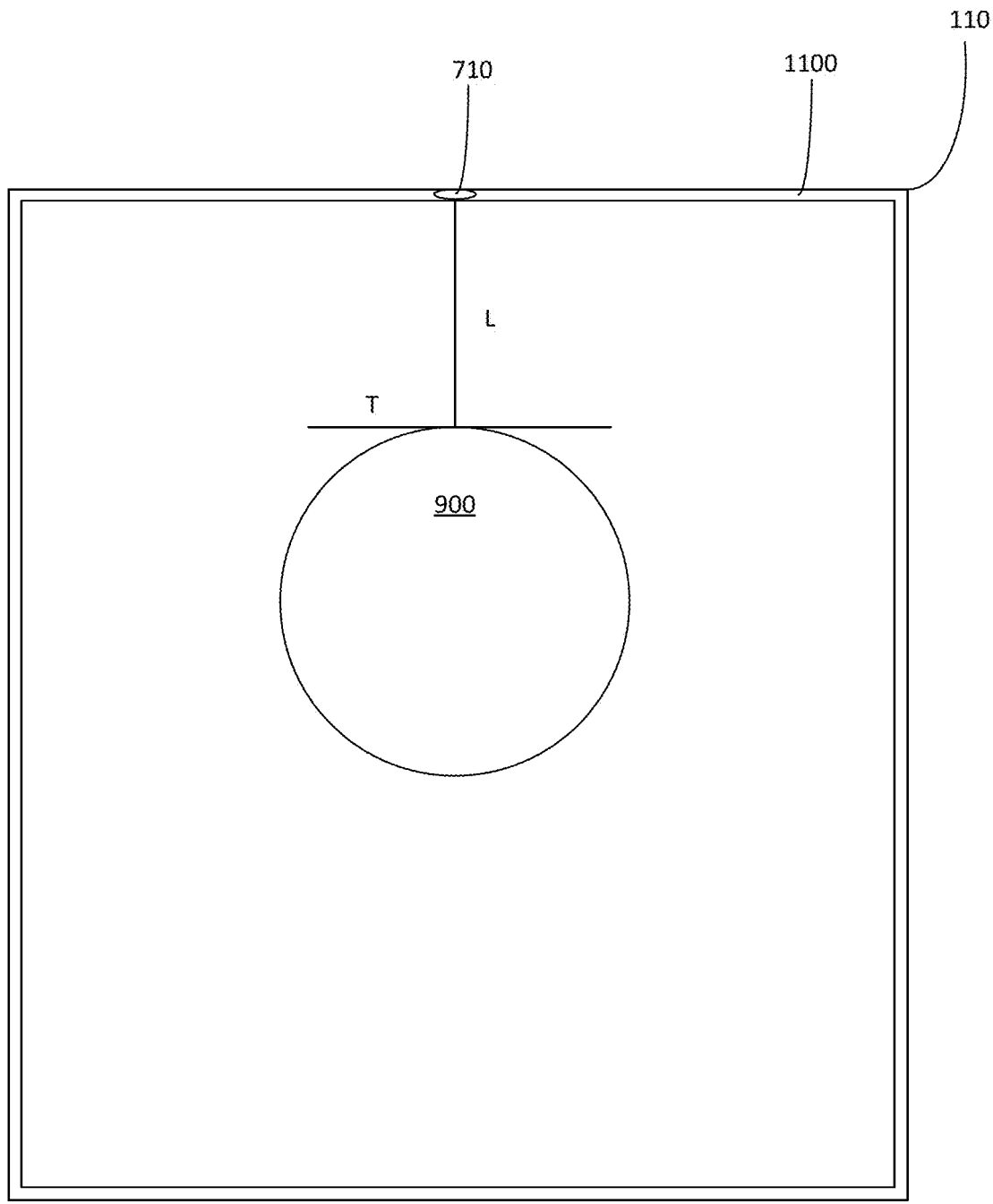
FIG. 11 is a top plan view showing an orientation of an ultrasonic sensor assembly with respect to a housing and a cylinder of the on-demand glasswasher of FIG. 1.

Assembly of various components of the on-demand glasswasher 100 will now be described with respect to FIGS. 10 and 11. FIG. 10 is a top plan view of the on-demand glasswasher 100 and FIG. 11 is a top plan view showing the orientation of the ultrasonic sensor assembly with respect to the housing and the cylinder. It will be appreciated that the on-demand glasswasher 100 is shown without a top covering for illustrative purposes only.

The motor and conveyor system 500 are positioned within the housing 110. The upper wash arms 350 and the upper rinse arms 430 are shown. It will be appreciated that the lower wash arms 355 and the lower rinse arms 435 are not visible in the top plan view of FIG. 9, however the lower wash arms 355 are located directly beneath the upper wash arms 250 and the lower rinse arms 435 are located directly beneath the upper rinse arms 430.

The ultrasonic sensor assembly 700 is positioned within the housing 110. Specifically, the ultrasonic sensor assembly 700 is positioned within the housing 110 of the on-demand glasswasher 100 such that the rounded face of the second fitting 720 extends out from the housing 110. In this embodiment, the housing 110 includes an opening (not shown) that is dimensioned to receive the ultrasonic sensor assembly 700. The opening is located at a mid-point of a front 1100 (FIG. 11) of the housing 110 and at a location such that the ultrasonic sensor assembly 700 is above the rotary conveyor 510.

The hook 825 of the sanitary divider 800 connects to a portion of the housing 110. The sanitary divider 800 is positioned adjacent to the ultrasonic sensor assembly 700 and such that the panel 810 extends into the housing 110.

The cylinder 900 is positioned within the center of the rotary conveyor 510 such that at least a portion of the cylinder 900 extends above the rotary conveyor 510 while still allowing the rotary conveyor 510 to rotate.

As mentioned, the cylinder 900 reflects ultrasound signals that are emitted by the ultrasonic sensor 710 and that contact the surface of the cylinder 900. To reduce processing of the ultrasound signals, the ultrasonic sensor assembly 700 and the cylinder 900 are fixed in position relative to one another. For example, the ultrasonic sensor assembly 700 and the cylinder 900 may be positioned such that a longitudinal axis of the ultrasonic sensor 710 is normal to a tangential axis of the cylinder 900. An example is shown in FIG. 11. As can be seen, the longitudinal axis L of the ultrasonic sensor 710 is normal or perpendicular to a tangential axis T of the cylinder 900. In this manner, ultrasound signals emitted by the ultrasonic sensor 710 that contact the cylinder 900 are reflected back towards the ultrasonic sensor 710 and received thereby.

In one or more embodiments, the ultrasonic sensor 700 and the cylinder 900 are fixed in position relative to the rotary conveyor 510. For example, the opening defined in the housing 110 may be defined such that position the ultrasonic sensor 700 is a predefined distance above the rotary conveyor 510. The predefined distance may include, for example, one (1) inch (2.5 cm) or two (2) inches (5.0 cm). In this manner, the ultrasonic sensor 700 may be positioned a distance above the rotary conveyor 510 such that the rotary conveyor 510 does not interfere with ultrasonic signals transmitted or received by the ultrasonic sensor 700. As another example, the cylinder 900 may be positioned such that a longitudinal axis of the cylinder 900 is normal or perpendicular to a planar surface or a top surface of the rotary conveyor 510.

The on-demand glasswasher 100 includes four zones. A load zone is defined at a first end of the housing 110. The load zone may be defined on a particular side of the sanitary divider 800. Specifically, the load zone may be defined such that any objects placed on the rotary conveyor 510 travel in a direction away from the sanitary divider 800. During use, a user places objects to be cleaned onto the rotary conveyor 510 at a location that corresponds to the load zone.

A wash zone is defined intermediate the upper wash arms 350. The wash zone is downstream of the load zone. As objects travel along the rotary conveyor (in the direction indicated by arrow A in FIG. 7) into the wash zone, the objects are washed by the wash system 300 in manners described herein.

A rinse zone is defined intermediate the upper rinse arms 430. The rinse zone is downstream of the wash zone. As objects travel along the rotary conveyor (in the direction indicated by arrow A in FIG. 7) into the rinse zone, the objects are rinsed by the rinse system 400 in manners described herein.

A clean zone is defined at the front end of the housing 110. The clean zone is downstream of the rinse zone. The clean zone may be defined on a second side of the sanitary divider 800. In this manner, the sanitary divider 800 divides or separates the load zone and the clean zone and this may ensure any dirt or debris from dirty or unwashed glasses does not contact or soil clean glasses located in the clean zone. During use, once objects have been washed and rinsed, they remain in the clean zone until the user removes them from the rotary conveyor 510.

As mentioned, the control system 200 includes at least a microprocessor and a memory device. The memory device is provided to store, amongst other things, instructions that, when executed by the microprocessor, causes the microprocessor to control operation of the on-demand glasswasher 100 and the various components thereof.

Figure 12:
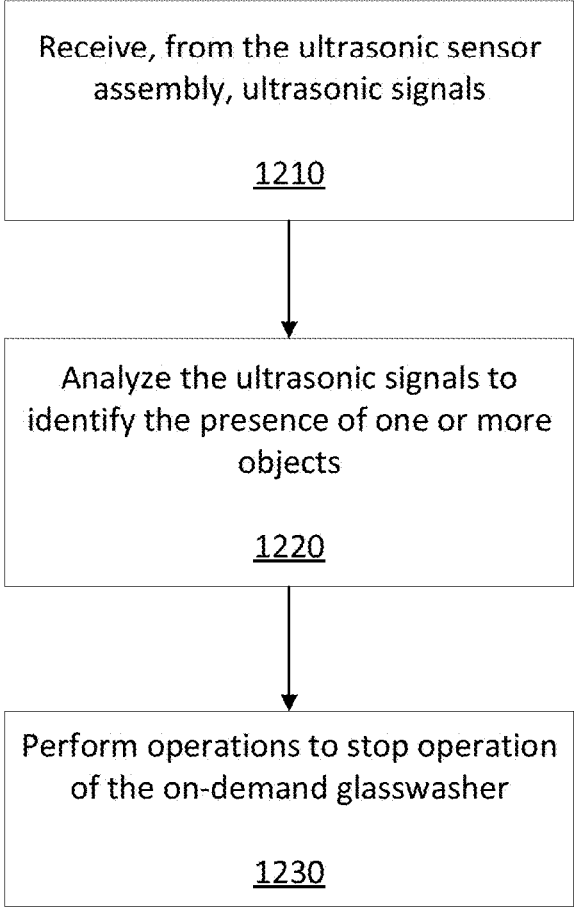
FIG. 12 is a flowchart showing operations performed by a microprocessor to detect the presence of one or more objects on the rotary conveyor forming part of the on-demand glasswasher of FIG. 1.

Reference is made to FIG. 12, which illustrates, in flowchart form, a method 1200 for processing ultrasonic signals to identify the presence of one or more objects. The method 1200 may be implemented by the microprocessor. For example, a memory device may be coupled to the microprocessor and may store processor-executable instructions which, when executed by the microprocessor, cause the microprocessor to carry out the method 1200.

The method 1200 includes receiving, from the ultrasonic sensor assembly, ultrasonic signals (step 1210).

In this embodiment, the ultrasonic sensor assembly 700, specifically the ultrasonic sensor 710, emits ultrasonic signals towards the cylinder 900. When no objects are present on the rotary conveyor 510 between the ultrasonic sensor assembly 700 and the cylinder 900, the ultrasonic signals reflect off of the cylinder 900 back towards the ultrasonic sensor 710 and received thereby. When one or more objects are present on the rotary conveyor 510 between the ultrasonic sensor assembly 700 and the cylinder 900, the ultrasonic signals reflect off of the one or more objects back towards the ultrasonic sensor 710 and received thereby.

The ultrasonic signals received by the ultrasonic sensor 710 are communicated to the microprocessor.

The method 1200 includes analyzing the ultrasonic signals to identify the presence of one or more objects (step 1220).

The microprocessor analyzes the ultrasonic signals to identify the presence of one or more objects. The analysis may include applying one or more filtering algorithms to the ultrasonic signals.

When no objects are present, analyzing the ultrasonic signals identifies the presence of the cylinder 900. For example, the microprocessor may identify that there is an object that is 20 cm away from the ultrasonic sensor and that this is the cylinder 900.

When objects are present, analyzing the ultrasonic signals identifies the presence of one or more objects. For example, the microprocessor may identify that there is an object that is less than 20 cm away from the ultrasonic sensor and as such the presence of one or more objects is identified.

In one or more embodiments, when identifying the presence of one or more objects, the microprocessor may determine, based on the ultrasonic signals, a distance between the one or more objects and the ultrasonic sensor assembly. The microprocessor may compare the distance to a known distance between the cylinder 900 and the ultrasonic sensor assembly 700. The microprocessor may determine the presence of the one or more objects when the distance between the one or more objects and the ultrasonic sensor assembly 700 is less than the known distance between the cylinder 900 of the on-demand glasswasher and the ultrasonic sensor assembly 700.

In one or more embodiments the microprocessor may determine a time between an emitted ultrasonic signal and a received ultrasonic signal and may use the time to calculate a distance to determine the presence of one or more objects.

Responsive to identifying the presence of one or more objects, the method 1200 includes performing operations to stop operation of the glasswasher (step 1230).

To stop operation of the glasswasher, the microprocessor sends signals causing one or more operations to stop.

Specifically, the microprocessor sends signals to close one or more of the valves 360, 405, the drains 320, 440, to turn off the pump 345, the drain pump 322, the injector 340, the injector 420, etc.

The microprocessor also sends a signal causing the drive motor to stop. As a result, the rotary conveyor stops moving and the one or more objects remain in the clean zone until removed by a user.

Figure 13:
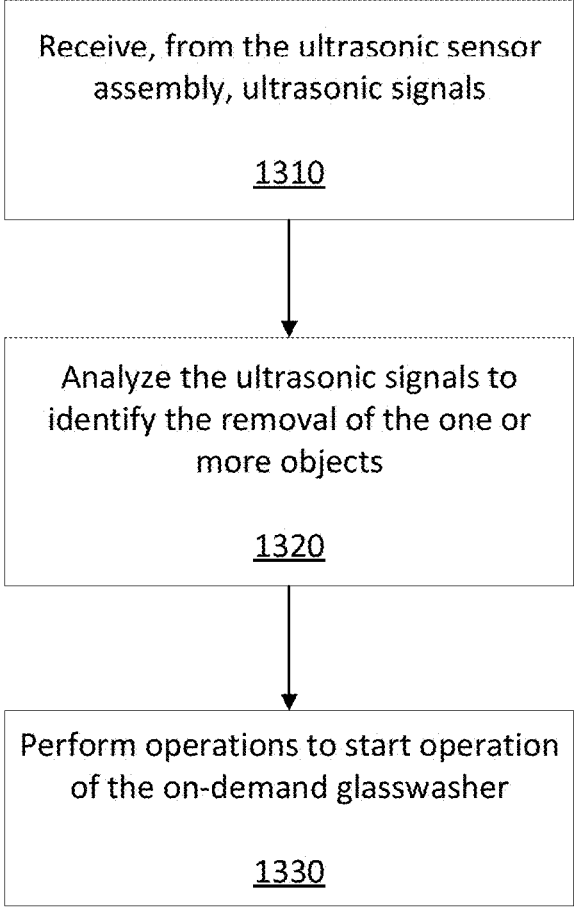
FIG. 13 is a flowchart showing operations performed by a microprocessor to detect the removal of one or more objects from a rotary conveyor forming part of the on-demand glasswasher of FIG. 1.

The ultrasonic sensor assembly continues to emit and receive ultrasonic signals and the ultrasonic signals may be analyzed by the microprocessor to detect the removal of the one or more objects. Reference is made to FIG. 13, which illustrates, in flowchart form, a method 1300 for processing ultrasonic signals to identify the removal of the one or more objects. The method 1300 may be implemented by the microprocessor. For example, a memory device may be coupled to the microprocessor and may store processor-executable instructions which, when executed by the microprocessor, cause the microprocessor to carry out the method 1300.

The method 1300 includes receiving, from the ultrasonic sensor assembly, ultrasonic signals (step 1310).

In this embodiment, the ultrasonic sensor assembly 700, specifically the ultrasonic sensor 710, emits ultrasonic signals towards the cylinder 900. When one or more objects are present on the rotary conveyor 510 between the ultrasonic sensor assembly 700 and the cylinder 900, the ultrasonic signals reflect off of the one or more objects back towards the ultrasonic sensor 710 and received thereby.

When the one or more objects are removed from the rotary conveyor 510, the ultrasonic signals reflect off of the cylinder 900 back towards the ultrasonic sensor 710 and received thereby.

The ultrasonic signals received by the ultrasonic sensor 710 are communicated to the microprocessor.

The method 1300 includes analyzing the ultrasonic signals to identify the removal of one or more objects (step 1320).

The microprocessor analyzes the ultrasonic signals to identify the removal of the one or more objects. The analysis may include applying one or more filtering algorithms to the ultrasonic signals.

When the one or more objects remain on the rotary conveyor 510, analyzing the ultrasonic signals identifies the presence of one or more objects. For example, the microprocessor may identify that an object that is less than 20 cm away from the ultrasonic sensor remains on the rotary conveyor 510 and as such it is determined that the one or more objects remain on the rotary conveyor 510.

When no objects are present, analyzing the ultrasonic signals identifies the presence of the cylinder 900. For example, the microprocessor may identify that there is an object that is 20 cm away from the ultrasonic sensor and that this is the cylinder 900. As such, the microprocessor identifies that the one or more objects have been removed from the rotary conveyor 510.

Responsive to identifying the removal of the one or more objects, the method 1300 includes performing operations to start operation of the on-demand glasswasher (step 1330).

To start operation of the glasswasher, the microprocessor sends signals causing one or more operations to start. Specifically, the microprocessor sends signals to open one or more of the valves 360, 405, the drains 320, 440, to turn on the pump 345, the drain pump 322, the injector 340, the injector 420, etc.

The microprocessor also sends a signal causing the drive motor to start. As a result, the rotary conveyor starts moving until the presence of one or more objects are detected by the microprocessor.

In accordance with the methods described herein with reference to FIG. 12 and FIG. 13, the microprocessor enables on-demand operation of the glasswasher. Put another way, once the on-demand glasswasher 100 has been powered on, the on-demand glasswasher 100 operates continuously in manners described herein. Specifically, the microprocessor controls operation of the on-demand glasswasher such that glasses placed in the load zone travel through the wash zone and rinse zone and to the clean zone. Once glasses are clean (and thus located in the clean zone), the ultrasonic sensor assembly and microprocessor perform operations to detect the presence of the glasses and the microprocessor sends a signal to stop the operation of the on-demand glasswasher until the glasses are removed.

Figure 14:
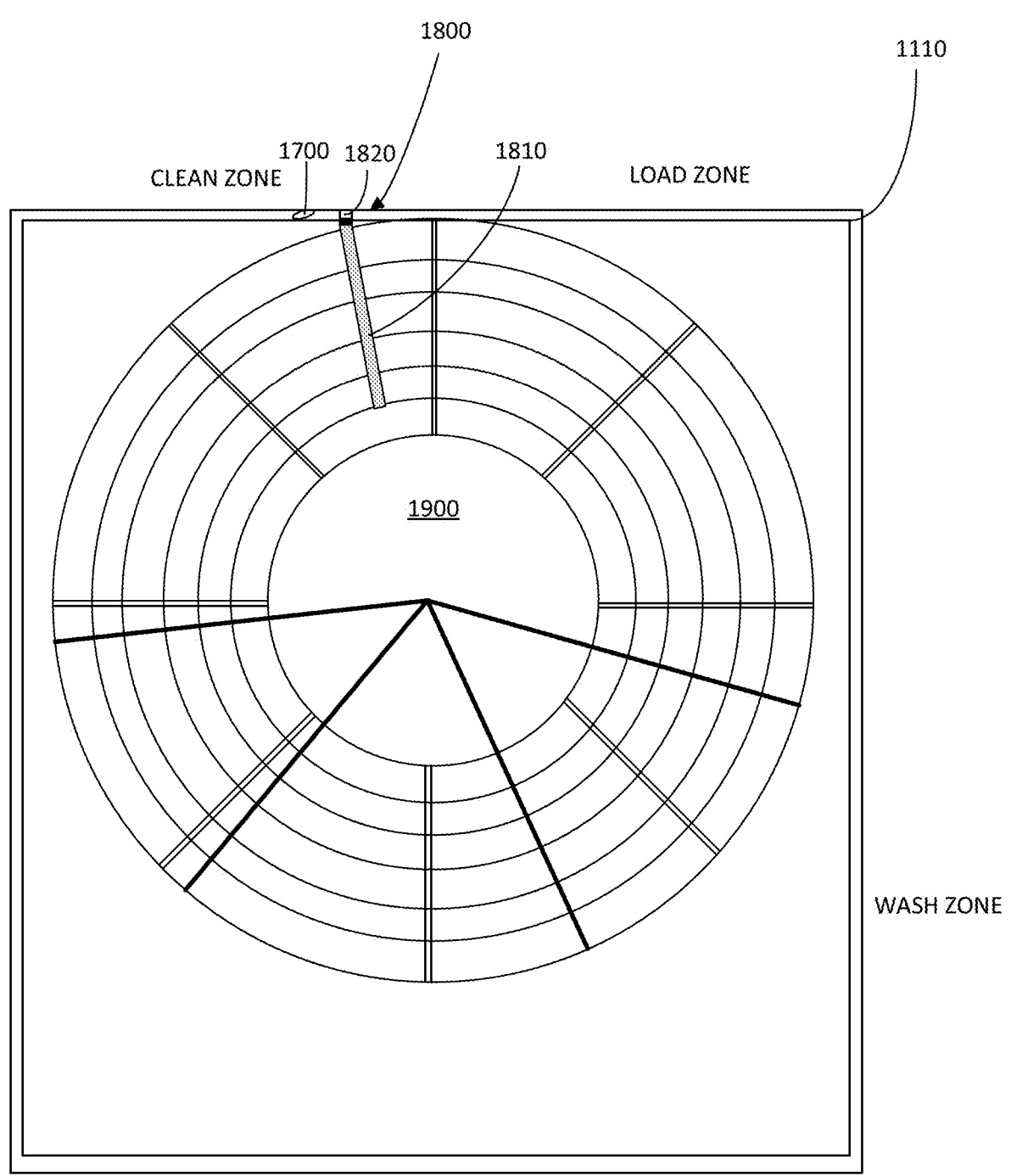
FIG. 14 is a top plan view of another embodiment of an on-demand glasswasher.
Figure 15:
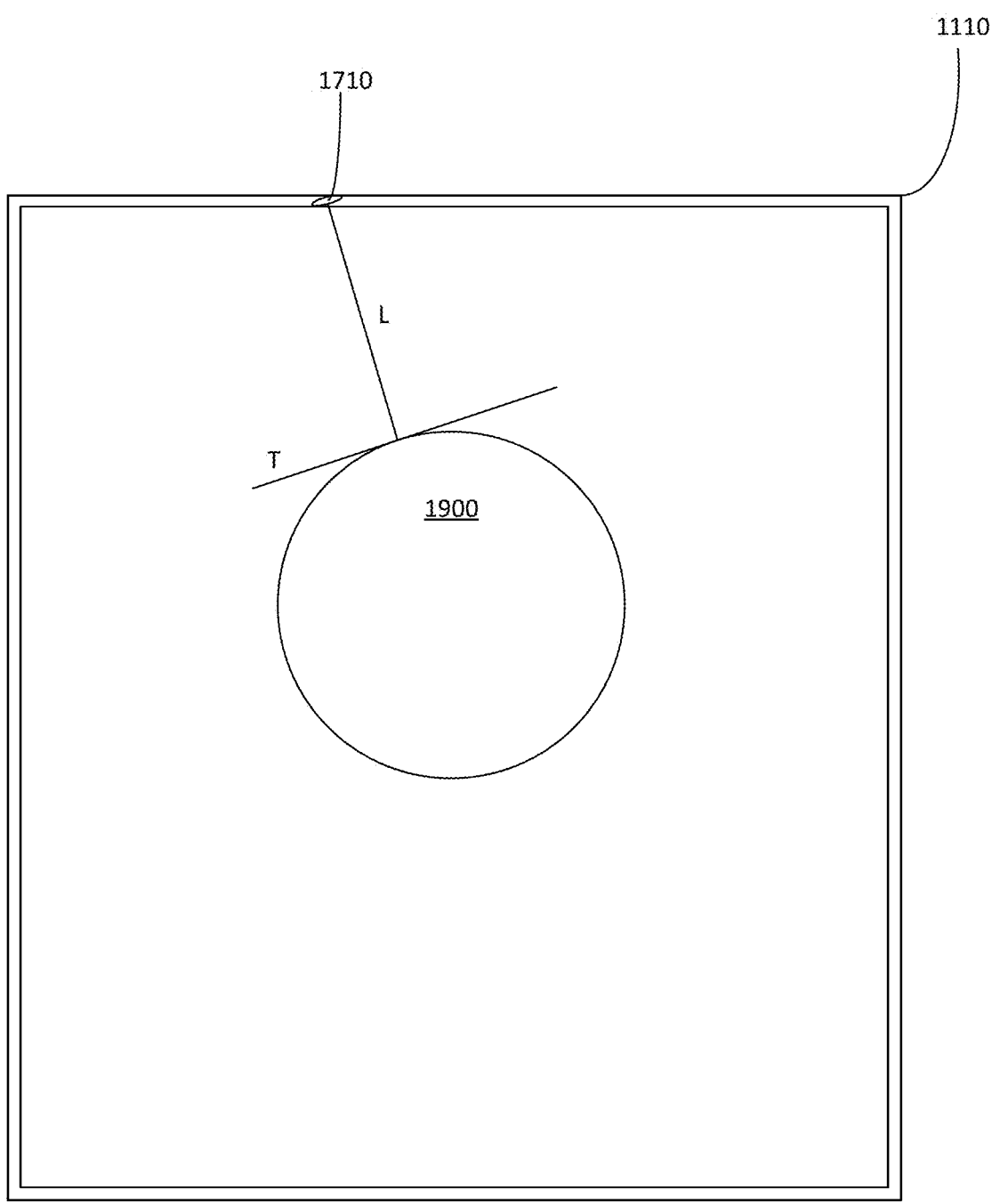
FIG. 15 is a top plan view showing an orientation of an ultrasonic sensor assembly with respect to a housing and a cylinder of the on-demand glasswasher of FIG. 14.

It will be appreciated that in one or more embodiments of the on-demand glasswasher described herein, the position of the ultrasonic sensor assembly and/or the sanitary divider may be different than the on-demand glasswasher 100 and this may result in an increased size of the load zone. FIG. 14 is a top plan view of another embodiment of an on-demand glasswasher and FIG. 15 is a top plan view of the on-demand glasswasher showing the orientation of the ultrasonic sensor assembly with respect to the housing 1110 and the cylinder 1900. The on-demand glasswasher is similar to the on-demand glasswasher 100 with the following exceptions and like components will be described using like reference characters with a "1000" added for clarity.

In this embodiment, the ultrasonic sensor assembly 1700 is positioned within the housing 1110 of the on-demand glasswasher such that the rounded face of the second fitting extends out from the housing 1110. In this embodiment, the housing 1110 includes an opening (not shown) that is dimensioned to receive the ultrasonic sensor assembly 1700. The opening is located off-center from a front of the housing 1110. Specifically, the opening is positioned such that a dimension of the clean zone is less than that of the on-demand glasswasher 100 (see, for example, FIGS. 10 and 11.

Similar to the on-demand glasswasher 100 shown in FIGS. 10 and 11, to reduce processing of the ultrasound signals, the ultrasonic sensor assembly 1700 and the cylinder 1900 are fixed in position relative to one another. Specifically, the ultrasonic sensor assembly 1700 and the cylinder 1900 are positioned such that a longitudinal axis of the ultrasonic sensor 1710 is normal to a tangential axis of the cylinder 1900. As can be seen in FIG. 15, the longitudinal axis L of the ultrasonic sensor 1710 is normal or perpendicular to a tangential axis T of the cylinder 1900. In this manner, ultrasound signals emitted by the ultrasonic sensor 1710 that contact the cylinder 1900 are reflected back towards the ultrasonic sensor 1710 and received thereby.

Further, the sanitary divider 1800 may be positioned such that the panel 1810 extends generally parallel to the longitudinal axis of the ultrasonic sensor 1710 and this may be done to ensure that the sanitary divider 1800 does not interfere with ultrasonic signals emitted by the ultrasonic sensor 1710.

As noted, certain adaptations and modifications of the described embodiments can be made. Therefore, the above discussed embodiments are considered to be illustrative and not restrictive.

What is claimed is:

1. An on-demand glasswasher comprising:
a drive motor;
a rotary conveyor connected to the drive motor;
an ultrasonic sensor assembly positioned adjacent to the rotary conveyor;
a microprocessor connected to the drive motor and the ultrasonic sensor assembly; and
a memory device coupled to the microprocessor, the memory device storing processor-executable instructions which, when executed by the microprocessor, cause the microprocessor to:
  receive, from the ultrasonic sensor assembly, ultrasonic signals;
  analyze the ultrasonic signals to detect a presence of one or more objects on the rotary conveyor by:
    determining, based on the ultrasonic signals, a distance between the one or more objects and the ultrasonic sensor assembly;
    comparing the distance to a known distance between a cylinder of the on-demand glasswasher and the ultrasonic sensor assembly; and
    determining the presence of the one or more objects when the distance between the one or more objects and the ultrasonic sensor assembly is less than the known distance between the cylinder of the on-demand glasswasher and the ultrasonic sensor assembly; and
  responsive to detecting the presence of one or more objects on the rotary conveyor, perform operations to stop operation of the on-demand glass washer.

2. The on-demand glasswasher of claim 1, wherein responsive to detecting the presence of the one or more objects, the instructions, when executed by the microprocessor, further cause the microprocessor to:
  receive, from the ultrasonic sensor assembly, additional ultrasonic signals;
  analyze the additional ultrasonic signals to detect removal of the one or more objects from the rotary conveyor; and
  responsive to detecting removal of the one or more objects from the rotary conveyor, perform operations to start operation of the on-demand glasswasher.

3. The on-demand glasswasher of claim 1, wherein the ultrasonic sensor assembly includes a casing and an ultrasonic sensor positioned within the casing, the casing defining an opening that allows ultrasonic signals emitted by the ultrasonic sensor to travel into the on-demand glasswasher.

4. The on-demand glasswasher of claim 3, wherein the casing includes a rounded surface that extends at least partially into the on-demand glasswasher, the rounded surface dimensioned to reduce or minimize a risk of the one or more objects falling over or being scratched when coming into contact therewith.

5. The on-demand glasswasher of claim 3, further comprising:
a cylinder positioned within an opening defined in a center of the rotary conveyor, wherein at least a portion of the cylinder extends above a surface of the rotary conveyor, the cylinder reflecting ultrasonic signals emitted by the ultrasonic sensor back towards the ultrasonic sensor when no objects are located on the rotary conveyor between the cylinder and the ultrasonic sensor.

6. The on-demand glasswasher of claim 5, wherein a longitudinal axis of the ultrasonic sensor is perpendicular to a tangential axis of the cylinder.

7. The on-demand glasswasher of claim 1, further comprising a sanitary divider connected to a housing of the on-demand glasswasher at a location adjacent to the ultrasonic sensor assembly, the sanitary divider comprising a panel that extends into the housing to separate a load zone and a clean zone of the on-demand glasswasher.

8. The on-demand glasswasher of claim 7, wherein the sanitary divider comprises a hook dimensioned to connect to a portion of the housing.

9. The on-demand glasswasher of claim 1, wherein an ultrasonic sensor of the ultrasonic sensor assembly emits the ultrasonic signals at a frequency of 200 kHz.

10. A method of operating an on-demand glasswasher, the method comprising:
  receiving, from an ultrasonic sensor assembly, ultrasonic signals;
  analyzing the ultrasonic signals to detect the presence of one or more objects on a rotary conveyor by:
    determining, based on the ultrasonic signals, a distance between the one or more objects and the ultrasonic sensor assembly;
    comparing the distance to a known distance between a cylinder of the on-demand glasswasher and the ultrasonic sensor assembly; and
    determining the presence of the one or more objects when the distance between the one or more objects and the ultrasonic sensor assembly is less than the known distance between the cylinder of the on-demand glasswasher and the ultrasonic sensor assembly; and
  responsive to detecting a presence of one or more objects on the rotary conveyor, performing operations to stop operation of the on-demand glasswasher.

11. The method of claim 10, wherein responsive to detecting the presence of the one or more objects, the method further comprises:
  receiving, from the ultrasonic sensor assembly, additional ultrasonic signals;
  analyzing the additional ultrasonic signals to detect removal of the one or more objects from the rotary conveyor; and
  responsive to detecting removal of the one or more objects from the rotary conveyor, performing operations to start operation of the on-demand glasswasher.

12. The method of claim 10, wherein the ultrasonic sensor assembly includes a casing and an ultrasonic sensor positioned within the casing, the casing defining an opening that allows ultrasonic signals emitted by the ultrasonic sensor to travel into the on-demand glasswasher.

13. The method of claim 12, wherein the casing includes a rounded surface that extends at least partially into the on-demand glasswasher, the rounded surface dimensioned to reduce or minimize a risk of the one or more objects falling over or being scratched when coming into contact therewith.

14. The method of claim 12, wherein the on-demand glasswasher further comprises a cylinder positioned within an opening defined in a center of the rotary conveyor, wherein at least a portion of the cylinder extends above a surface of the rotary conveyor, the cylinder reflecting ultrasonic signals emitted by the ultrasonic sensor back towards the ultrasonic sensor when no objects are located on the rotary conveyor between the cylinder and the ultrasonic sensor.

15. The method of claim 14, wherein a longitudinal axis of the ultrasonic sensor is perpendicular to a tangential axis of the cylinder.

16. The method of claim 10, wherein the on-demand glasswasher further comprises a sanitary divider connected to a housing of the on-demand glasswasher at a location adjacent to the ultrasonic sensor assembly, the sanitary divider comprising a panel that extends into the housing to separate a load zone and a clean zone of the on-demand glasswasher.

17. The method of claim 16, wherein the sanitary comprises a hook dimensioned to connect to a portion of the housing.

18. The method of claim 10, wherein an ultrasonic sensor of the ultrasonic sensor assembly emits the ultrasonic signals at a frequency of 200 kHz.

19. An on-demand glasswasher comprising:

a drive motor;

a rotary conveyor connected to the drive motor;

an ultrasonic sensor assembly positioned adjacent to the rotary conveyor, the ultrasonic sensor assembly including a casing and an ultrasonic sensor positioned within the casing, the casing defining an opening that allows ultrasonic signals emitted by the ultrasonic sensor to travel into the on-demand glasswasher;

a microprocessor connected to the drive motor and the ultrasonic sensor assembly; and

16 a memory device coupled to the microprocessor, the memory device storing processor-executable instructions which, when executed by the microprocessor, cause the microprocessor to:

receive, from the ultrasonic sensor assembly, ultrasonic signals;

analyze the ultrasonic signals to detect a presence of one or more objects on the rotary conveyor; and responsive to detecting the presence of one or more objects on the rotary conveyor, perform operations to stop operation of the on-demand glasswasher.

20. The on-demand glasswasher of claim 19, further comprising:

a cylinder positioned within an opening defined in a center of the rotary conveyor, wherein at least a portion of the cylinder extends above a surface of the rotary conveyor, the cylinder reflecting ultrasonic signals emitted by the ultrasonic sensor back towards the ultrasonic sensor when no objects are located on the rotary conveyor between the cylinder and the ultrasonic sensor.

\* \* \* \* \*